US 11,535,279 B2

(12) United States Patent
Ito et al.

(10) Patent No.: US 11,535,279 B2
(45) Date of Patent: Dec. 27, 2022

(54) VEHICLE POSITION SENSING SYSTEM

(71) Applicant: TOYOTA JIDOSHA KABUSHIKI KAISHA, Toyota (JP)

(72) Inventors: Yuki Ito, Iwakura (JP); Tsukasa Nakanishi, Nagoya (JP); Yuta Morikawa, Miyoshi (JP); Naoki Yamamuro, Nagoya (JP); Yuki Tatsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 16/889,169

(22) Filed: Jun. 1, 2020

(65) Prior Publication Data

US 2021/0024098 A1 Jan. 28, 2021

(30) Foreign Application Priority Data

Jul. 23, 2019 (JP) .............................. JP2019-135662

(51) Int. Cl.
*B60W 60/00* (2020.01)
*G01C 21/36* (2006.01)

(52) U.S. Cl.
CPC .... *B60W 60/0053* (2020.02); *B60W 60/0018* (2020.02); *B60W 60/0059* (2020.02); *G01C 21/3667* (2013.01)

(58) Field of Classification Search
CPC ......... B60W 60/0053; B60W 60/0018; B60W 60/0059; B60W 50/14; B60W 2050/146; B60W 50/082; G01C 21/3667; B60K 2370/166; B60K 2370/172; B60K 2370/175; B60K 2370/1876; B60K 2370/197; B60K 2370/592; B60K 35/00; G05D 1/0038; G05D 1/0061; G05D 1/0278

See application file for complete search history.

(56) References Cited

U.S. PATENT DOCUMENTS 9,964,948 B2   5/2018  Ullrich et al.
2018/0120844 A1 5/2018 Okamoto et al.
(Continued)

FOREIGN PATENT DOCUMENTS

JP    H08-54925 A    2/1996
JP    2016-207062 A  12/2016
(Continued)

*Primary Examiner* — Daryl C Pope
(74) *Attorney, Agent, or Firm* — Oliff PLC

(57) ABSTRACT

A vehicle position sensing system includes: a position information acquiring section that acquires position information of a vehicle; a storage section that stores first region information, which expresses automatic driving regions where automatic driving of the vehicle is possible and remote driving regions where remote operation driving of the vehicle is possible, and second region information that expresses manual driving regions where only manual driving of the vehicle is permitted; a head up display that can be viewed by a driver of the vehicle; and a control section that, on the basis of the position information of the vehicle, the first region information and the second region information, causes the head up display to display relative positional relationships among the vehicle, the automatic driving regions, the remote driving regions and the manual driving regions.

7 Claims, 9 Drawing Sheets

(56) References Cited

U.S. PATENT DOCUMENTS

| | | | |
|---|---|---|---|
| 2019/0178660 A1* | 6/2019 | Greenberg | ......... G01C 21/3461 |
| 2019/0265710 A1 | 8/2019 | Kaneko et al. | |
| 2020/0231181 A1 | 7/2020 | Miyahara et al. | |
| 2020/0318986 A1 | 10/2020 | Nara et al. | |
| 2021/0197808 A1 | 7/2021 | Maeda et al. | |

FOREIGN PATENT DOCUMENTS

| | | | | |
|---|---|---|---|---|
| JP | 2019-093879 A | 6/2019 | | |
| JP | 2019-105612 A | 6/2019 | | |
| WO | WO-2016152874 A1 * | 9/2016 | ............. | G01C 21/32 |
| WO | 2018/025414 A1 | 2/2018 | | |
| WO | 2018/087880 A1 | 5/2018 | | |
| WO | 2019/077739 A1 | 4/2019 | | |

* cited by examiner

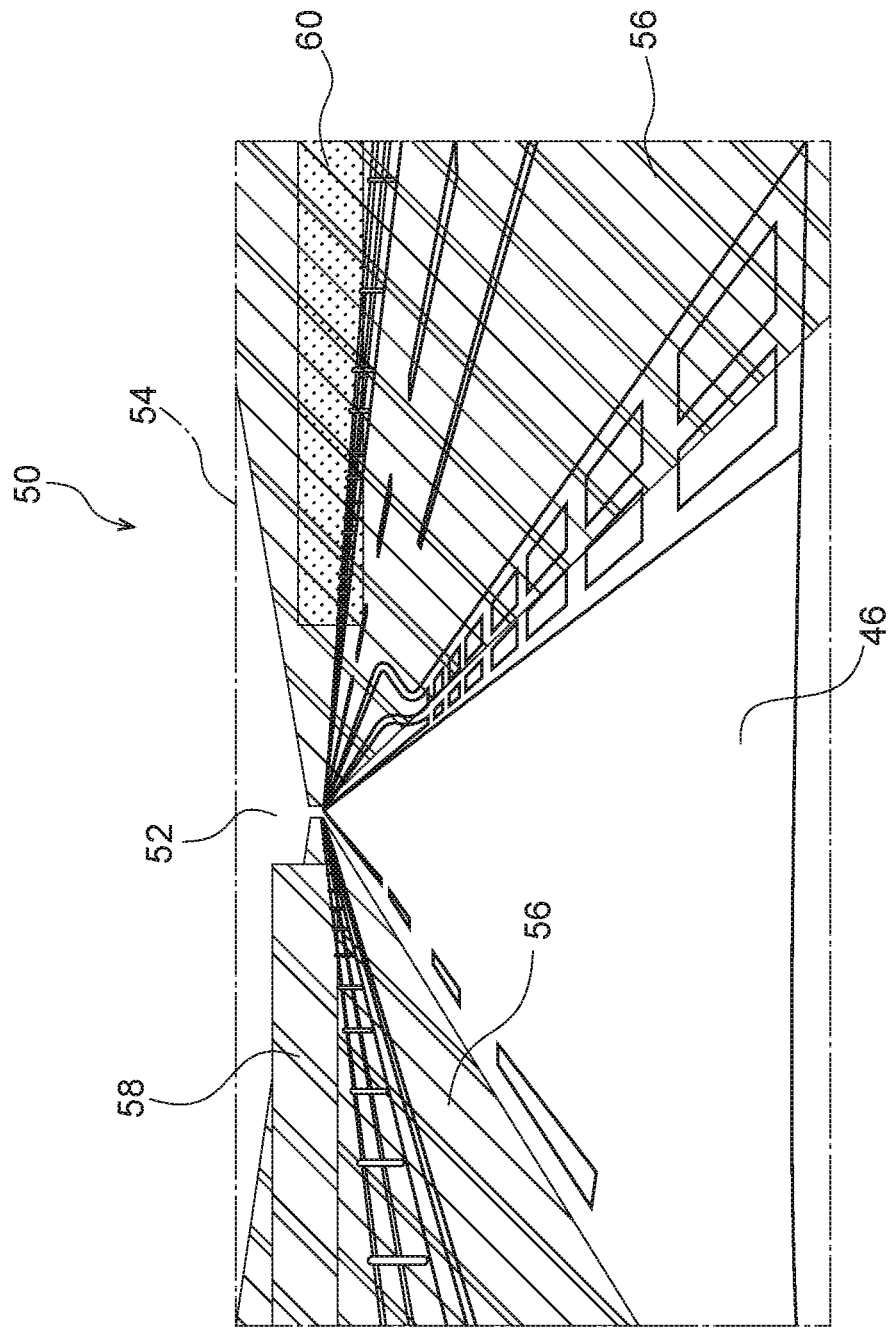

VEHICLE POSITION SENSING SYSTEM

CROSS-REFERENCE TO RELATED APPLICATION

This application is based on and claims priority under 35 USC 119 from Japanese Patent Application No. 2019-135662 filed on Jul. 23, 2019, the disclosure of which is incorporated by reference herein.

BACKGROUND

Technical Field

The present disclosure relates to a vehicle position sensing system.

Related Art

U.S. Pat. No. 9,964,948 (Patent Document 1) discloses an invention relating to remote control for a group of autonomous transport vehicles.

In this remote control for a group of autonomous transport vehicles, if an event occurs, the autonomous vehicle notifies a control center of that event, and starts interacting with the control center, or the control center takes over the driving of the autonomous vehicle.

SUMMARY

Depending on the road situation and the structural state, in a state in which a vehicle is being driven automatically or is being operated remotely, there are cases in which it becomes difficult to continue the traveling of the vehicle. Further, in a place in which the vehicle cannot be driven by automatic driving or remote operation, an occupant of the vehicle (the driver) must drive the vehicle himself/herself. Further, taking into consideration the point of being able to ensure time for the vehicle occupant to prepare for manual driving, and the like, it is preferable that the vehicle occupant be able to perceive regions in which manual driving is needed, and at least one type of region among regions in which automatic driving is possible and regions in which remote operation driving is possible.

With regard to this point, in the prior art technique of aforementioned Patent Document 1, the vehicle occupant cannot perceive regions in which the vehicle can be driven automatically and regions in which the vehicle can be driven by remote operation. Accordingly, in the prior art of aforementioned Patent Document 1, there is room for improvement with regard to the point of the vehicle occupant perceiving regions in which manual driving is required, and at least one type of region among regions in which automatic driving of the vehicle is possible and regions in which remote operation driving of the vehicle is possible.

In view of the above-described circumstances, an object of the present disclosure is to provide a vehicle position sensing system that enables an occupant of a vehicle to perceive regions in which manual driving is needed, and at least one type of region among regions in which automatic driving of the vehicle is possible and regions in which remote operation driving of the vehicle is possible.

A vehicle position sensing system of a first aspect includes: a position information acquiring section that acquires position information of a vehicle; a storage section that stores first region information, which expresses at least one type of region among automatic driving regions where automatic driving of the vehicle is possible and remote driving regions where remote operation driving of the vehicle is possible, and second region information that expresses manual driving regions where only manual driving of the vehicle is permitted; a display portion that can be viewed by an occupant of the vehicle; and a control section that, based on the position information, the first region information and the second region information, causes the display portion to display relative positional relationships among the vehicle, the manual driving regions and the at least one type of region.

In accordance with the vehicle position sensing system of the first aspect, position information of the vehicle is acquired by the position information acquiring section. On the other hand, first region information, which expresses at least one type of region among automatic driving regions where automatic driving of the vehicle is possible and remote driving regions where remote operation driving of the vehicle is possible, and second region information that expresses manual driving regions where only manual driving of the vehicle is permitted, are stored in the storage section.

On the basis of the position information of the vehicle, the first region information and the second region information, the control section controls the display portion that can be seen by an occupant of the vehicle. Due thereto, the relative positional relationships among the vehicle, the manual driving regions, and at least one type of region among the automatic driving regions and the remote driving regions, are displayed on the display portion.

In a vehicle position sensing system of a second aspect, in the vehicle position sensing system of the first aspect, the automatic driving regions and the remote driving regions are included in the first region information, and the display portion can display the automatic driving regions and the remote driving regions.

In accordance with the vehicle position sensing system of the second aspect, the automatic driving regions and the remote driving regions are stored in the storage section as the first region information. The automatic driving regions and the remote driving regions are displayed on the display portion.

In a vehicle position sensing system of a third aspect, in the vehicle position sensing system of the first or second aspect, the relative positional relationships among a position of the vehicle, the manual driving regions and the at least one type of region, can be displayed in a planar form on the display portion.

In accordance with the vehicle position sensing system of the third aspect, the position of the vehicle, the manual driving regions, and at least one type of region among the automatic driving regions and the remote driving regions are displayed in a planar form on the display portion.

In a vehicle position sensing system of a fourth aspect, in the vehicle position sensing system of the third aspect, a route of the vehicle to a destination, the manual driving regions, and at least the one type of region can be displayed on the display portion.

In accordance with the vehicle position sensing system of the fourth aspect, the route of the vehicle to the destination, the manual driving regions, and at least one type of region among the automatic driving regions and the remote driving regions are displayed on the display portion.

In a vehicle position sensing system of a fifth aspect, in the vehicle position sensing system of the fourth aspect, the vehicle has a notification section that, in a state in which the vehicle is positioned in the at least one type of region on the route, issues a warning to an occupant of the vehicle when the vehicle is positioned at a position that is within a predetermined distance from a manual driving regions.

In accordance with the vehicle position sensing system of the fifth aspect, in a state in which the vehicle is positioned on the route to the destination in at least one type of region among the automatic driving regions and the remote driving regions, the notification section issues a warning to the occupant of the vehicle when the vehicle is positioned at a position that is within a predetermined distance from a manual driving region.

In a vehicle position sensing system of a sixth aspect, in the vehicle position sensing system of the fourth or fifth aspect, in a state in which the vehicle is positioned on the route, the control section can display, on a windshield glass of the vehicle, three-dimensional objects that enable an occupant of the vehicle to identify the manual driving regions and the at least one type of region, such that the three-dimensional objects run along the route and overlap a scene that can be seen from the windshield glass.

In accordance with the vehicle position sensing system of the sixth aspect, due to control of the control section, in a state in which the vehicle is positioned on the route to the destination, three-dimensional objects that enable an occupant of the vehicle to identify the manual driving regions and at least one type of region among the automatic driving regions and the remote driving regions, are displayed on a windshield glass of the vehicle such that the three-dimensional objects run along the route and overlap a landscape that can be seen from the windshield glass.

As described above, the vehicle position sensing system of the first aspect has the excellent effect that an occupant of a vehicle can perceive regions in which manual driving is needed, and at least one type of region among regions in which automatic driving of the vehicle is possible and regions in which remote operation driving of the vehicle is possible.

The vehicle position sensing system of the second aspect has the excellent effect that an occupant of the vehicle can perceive regions where manual driving is needed, regions where automatic driving of the vehicle is possible, and regions where remote operation driving of the vehicle is possible.

The vehicle position sensing system of the third aspect has the excellent effect that an occupant of the vehicle can easily understand the relative positional relationships among the position of the vehicle, the manual driving regions, and at least one type of region among the automatic driving regions and the remote driving regions.

The vehicle position sensing system of the fourth aspect has the excellent effect that an occupant of the vehicle can perceive the manual driving regions, and at least one type of region among the automatic driving regions and the remote driving regions, on the route of the vehicle to the destination.

The vehicle position sensing system of the fifth aspect has the excellent effect that an occupant of the vehicle can, without looking at the display portion, know that the vehicle is approaching a manual driving region.

The vehicle position sensing system of the sixth aspect has the excellent effect that an occupant of the vehicle can, without looking away from the vehicle front side, perceive the manual driving regions and at least one type of region among the automatic driving regions and the remote driving regions.

BRIEF DESCRIPTION OF THE DRAWINGS

Preferred embodiments will be described in detail based on the following figures, wherein:

FIG. 9 is a conceptual drawing that schematically shows an example of a display screen of a display portion in a vehicle position sensing system relating to a second embodiment.

DETAILED DESCRIPTION

First Embodiment

Figure 1:
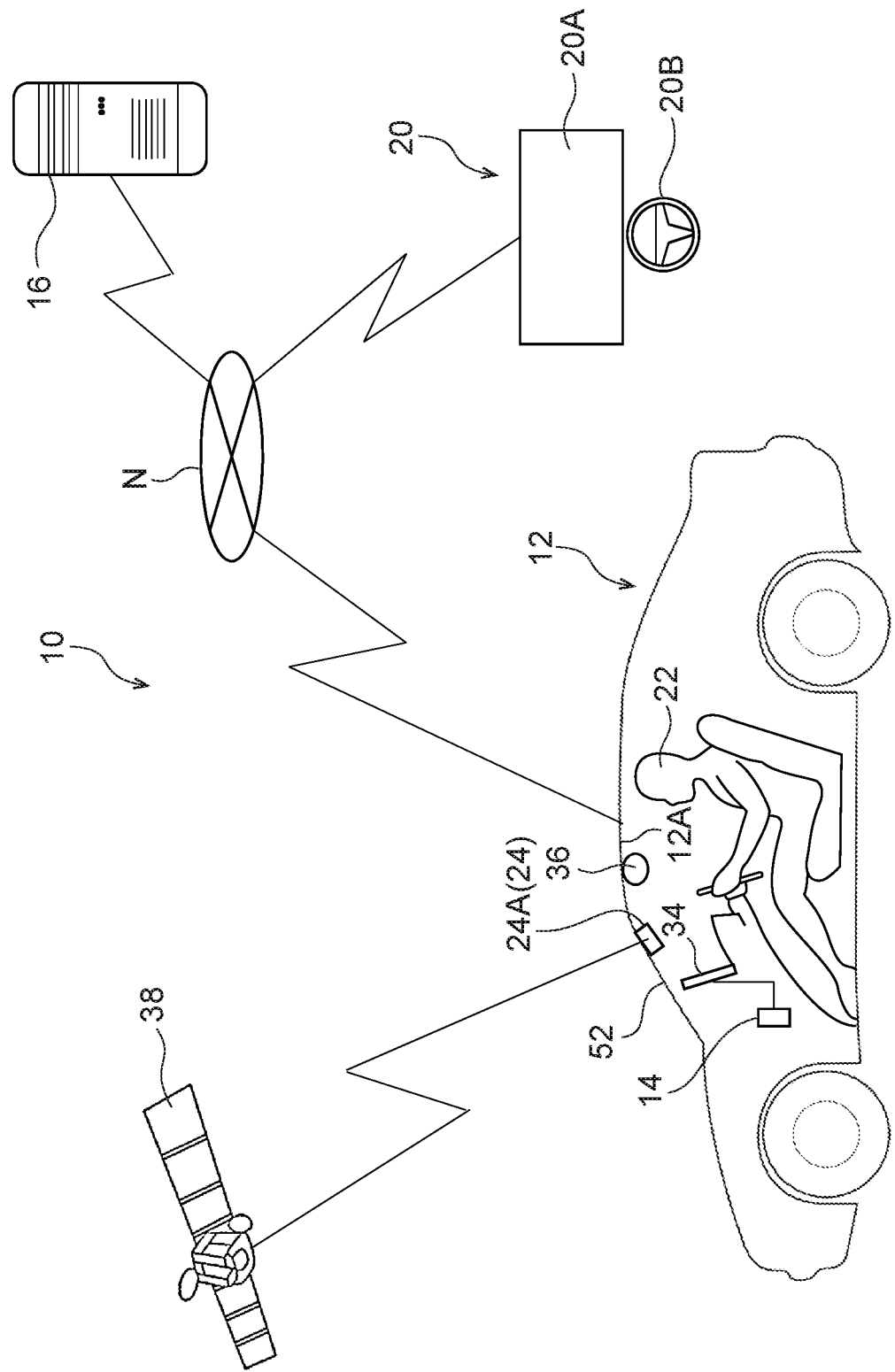
FIG. 1 is a schematic drawing that schematically shows the structure of a vehicle position sensing system relating to a first embodiment.

A "vehicle position sensing system 10" relating to a first embodiment is described hereinafter by using FIG. 1 through FIG. 8. As shown in FIG. 1, the vehicle position sensing system 10 is structured to include a vehicle control device 14, which is installed in a "vehicle 12", and a server 16.

The vehicle 12 can be operated remotely by a remote operation device 20 that has a remote control device 18. The vehicle control device 14, the remote control device 18 and the server 16 are connected via a network N so as to be able to communicate with one another. Note that, although details thereof are described later, the vehicle 12 is structured such that automatic driving by the vehicle control device 14 and manual driving that is based on the operations of a driver (vehicle occupant) 22 of the vehicle 12 can be carried out in addition to remote operation driving by the remote operation device 20.

Figure 3:
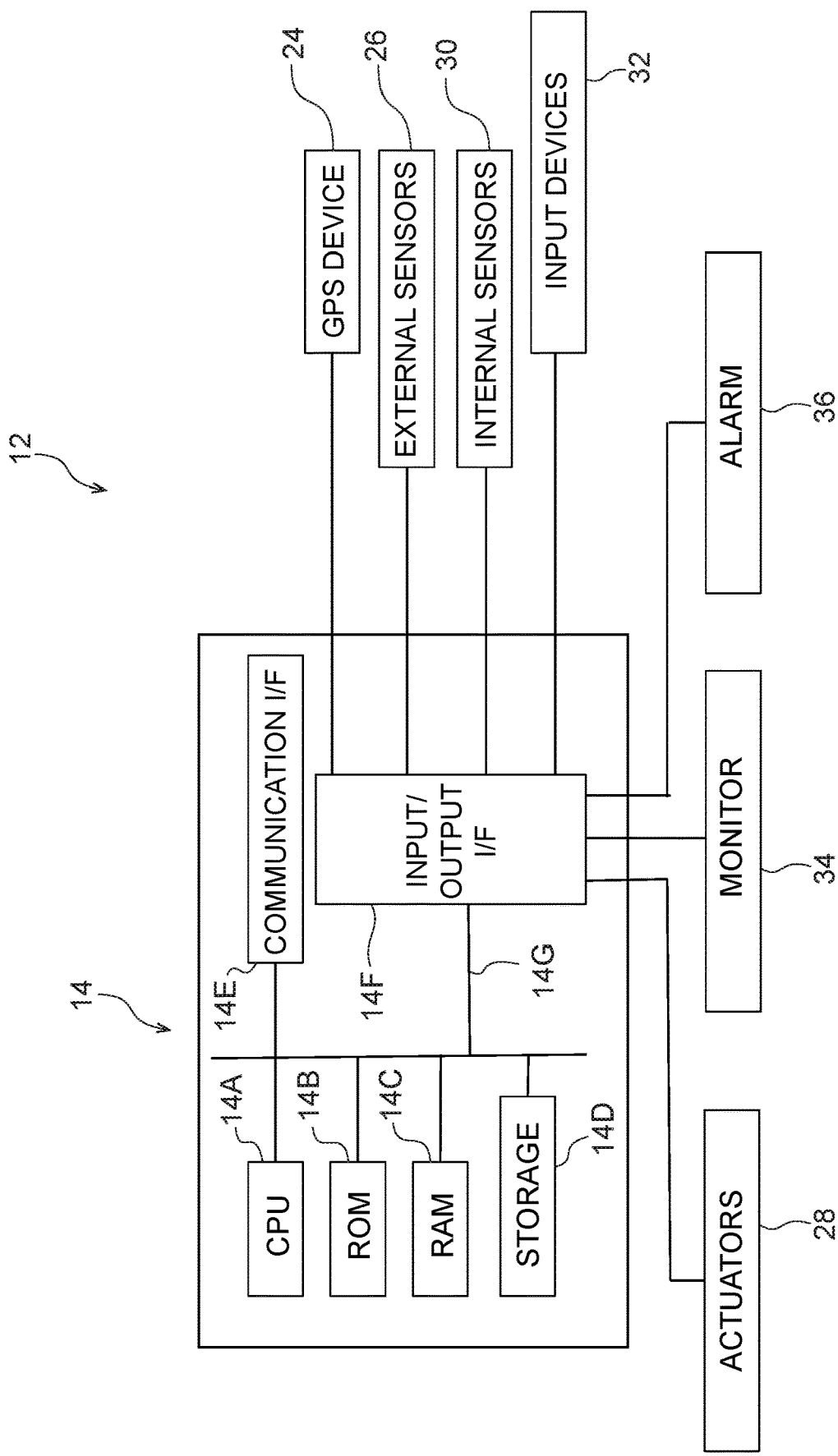
FIG. 3 is a block drawing showing hardware structures of a vehicle in the vehicle position sensing system relating to the first embodiment.

As shown in FIG. 3, the vehicle control device 14 is structured to include a CPU (Central Processing Unit) 14A, a ROM (Read Only Memory) 14B, a RAM (Random Access Memory) 14C, a storage 14D, a communication I/F (Inter Face) 14E and an input/output I/F 14F. The CPU 14A, the ROM 14B, the RAM 14C, the storage 14D, the communication I/F 14E and the input/output I/F 14F are connected so as to be able to communicate with one another via a bus 14G.

The CPU 14A is a central computing processing unit, and can execute various types of programs and can control the respective sections of the vehicle 12. Concretely, the CPU 14A reads-out programs from the ROM 14B, and can execute the programs by using the RAM 14C as a workspace. Due to an execution program that is stored in the ROM 14B being read-out by and executed by the CPU 14A, the vehicle control device 14 can exhibit various functions as will be described later.

More specifically, various types of programs and various types of data are stored in the ROM 14B. On the other hand, the RAM 14C can temporarily store programs and data as a workspace.

The storage 14D is structured to include an HDD (Hard Disk Drive) or an SSD (Solid State Drive), and stores various types of programs, including the operating system, and various types of data. As described later, the storage 14D can store environment information that is needed for automatic driving of the vehicle 12, and the like.

The communication I/F 14E is an interface that is used in connecting the vehicle control device 14 and the network N, and communication with the remote control device 18 and the server 16 and the like is made possible thereby. Communication standards of, for example, the Internet®, FDDI, Wi-Fi® and the like are used at the interface. Further, the communication I/F 14E may have a wireless device.

The communication I/F 14E can transmit and receive various information to and from the remote operation device 20 via the network N. In detail, the communication I/F 14E can receive environment information from the server 16 via the network N. Note that the environment information includes weather information such as air temperature, wind speed, amount of precipitation and the like, earthquake information such as magnitude, tsunami warnings and the like, traffic information such as traffic jams, accidents, road construction and the like, and map information and the like. These environment information are stored in the storage 14D.

The input/output I/F 14F is an interface for the vehicle control device 14 to communicate with the respective devices that are installed in the vehicle 12. The vehicle control device 14 is connected via the input/output I/F 14F so as to be able to communicate with respective devices that are described later. Note that these devices may be directly connected to the bus 14G.

A GPS (Global Positioning System) device 24, external sensors 26, actuators 28, internal sensors 30, input devices 32, a "head up display 34 (hereinafter called display 34)" serving as a display portion, and an "alarm 36" serving as a notification section are examples of devices that are connected to the vehicle control device 14.

The GPS device 24 has an antenna 24A that receives signals from an artificial satellite (a GPS satellite) 38, and can measure the current position of the vehicle 12. The position information of the vehicle 12 that is measured by the GPS device 24 is inputted to the storage 14D and is stored temporarily in the storage 14D.

The external sensors 26 are a group of sensors that are used in detecting the peripheral environment of the vehicle 12. The external sensors 26 include cameras (not illustrated) that capture images of predetermined ranges, millimeter wave radar (not illustrated) that transmits search waves in a predetermined range, and LIDAR (Laser Imaging Detection and Ranging) (not illustrated) that scans a predetermined range. The data, which is acquired by the external sensors 26 and is images captured by the cameras, is stored in the storage 14D, and is sent from the communication I/F 14E via the server 16 and transmitted to the remote operation device 20.

The internal sensors 30 are a group of sensors that are used in detecting the traveling state of the vehicle 12, and include at least one of a vehicle speed sensor, an acceleration sensor and a yaw rate sensor. The data acquired by the internal sensors 30 is stored in the storage 14D.

The actuators 28 are devices that control the traveling of the vehicle 12 in accordance with control signals from the vehicle control device 14, and include a throttle actuator (not illustrated), a brake actuator (not illustrated), and a steering actuator (not illustrated).

The throttle actuator controls the acceleration devices on the basis of control signals from the vehicle control device 14, and, by controlling the amount of air that is supplied to the engine (not illustrated) of the vehicle 12 (i.e., by controlling the throttle opening), can control the driving force of the vehicle 12. Note that in a case in which the vehicle 12 is a hybrid vehicle or an electric automobile, the driving force of the vehicle 12 may be controlled by controlling the motor that is the power source in accordance with control signals of the vehicle control device 14.

The brake actuator controls the brake devices on the basis of control signals from the vehicle control device 14, and can control the braking force that is applied to the wheels (not illustrated) of the vehicle 12.

On the basis of control signals from the vehicle control device 14, the steering actuator controls the driving force of an assist motor (not illustrated) that controls the steering torque among the steering devices. Due thereto, the steering actuator can control the steering torque of the vehicle 12.

On the other hand, the input devices 32 include the steering wheel (not illustrated), the brake pedal (not illustrated), and the acceleration pedal (not illustrated). The amounts by which these are operated are detected by operation amount sensors (not illustrated), and are transmitted to the vehicle control device 14. Further, at the time of manual driving of the vehicle 12, the vehicle control device 14 transmits control signals that are based on the aforementioned operation amounts to the actuators 28, and can control the acceleration devices, the braking devices and the steering devices.

The display 34 is a liquid crystal monitor for displaying various types of information relating to the vehicle 12. Concretely, as is described later, position information of the vehicle 12 and map information of the periphery of the vehicle 12 and the like are displayed on the display 34. Note that the display 34 can be operated on the basis of input from a touch panel (not illustrated) that is connected to the vehicle control device 14 such that communication therebetween is possible.

A selection screen for selecting an automatic driving mode, a remote operation mode, and a manual driving mode can be displayed on the touch panel. The operator 22 can select the driving mode of the vehicle 12 by operating the touch panel.

Concretely, due to the operator 22 operating the touch panel and selecting one mode among the above-described plural modes, a status signal, which expresses that the vehicle control device 14 and the remote control device 18 are in that mode, is transmitted from the touch panel to the vehicle control device 14 and the remote control device 18. Note that the vehicle control device 14 and the remote control device 18 are set so as to detect the status signal each predetermined time period. Further, the destination of the vehicle 12 also can be inputted through the touch panel.

The alarm 36 is disposed within a vehicle cabin 12A of the vehicle 12, and can warn the operator 22 on the basis of a control signal from the vehicle control device 14.

Figure 2:
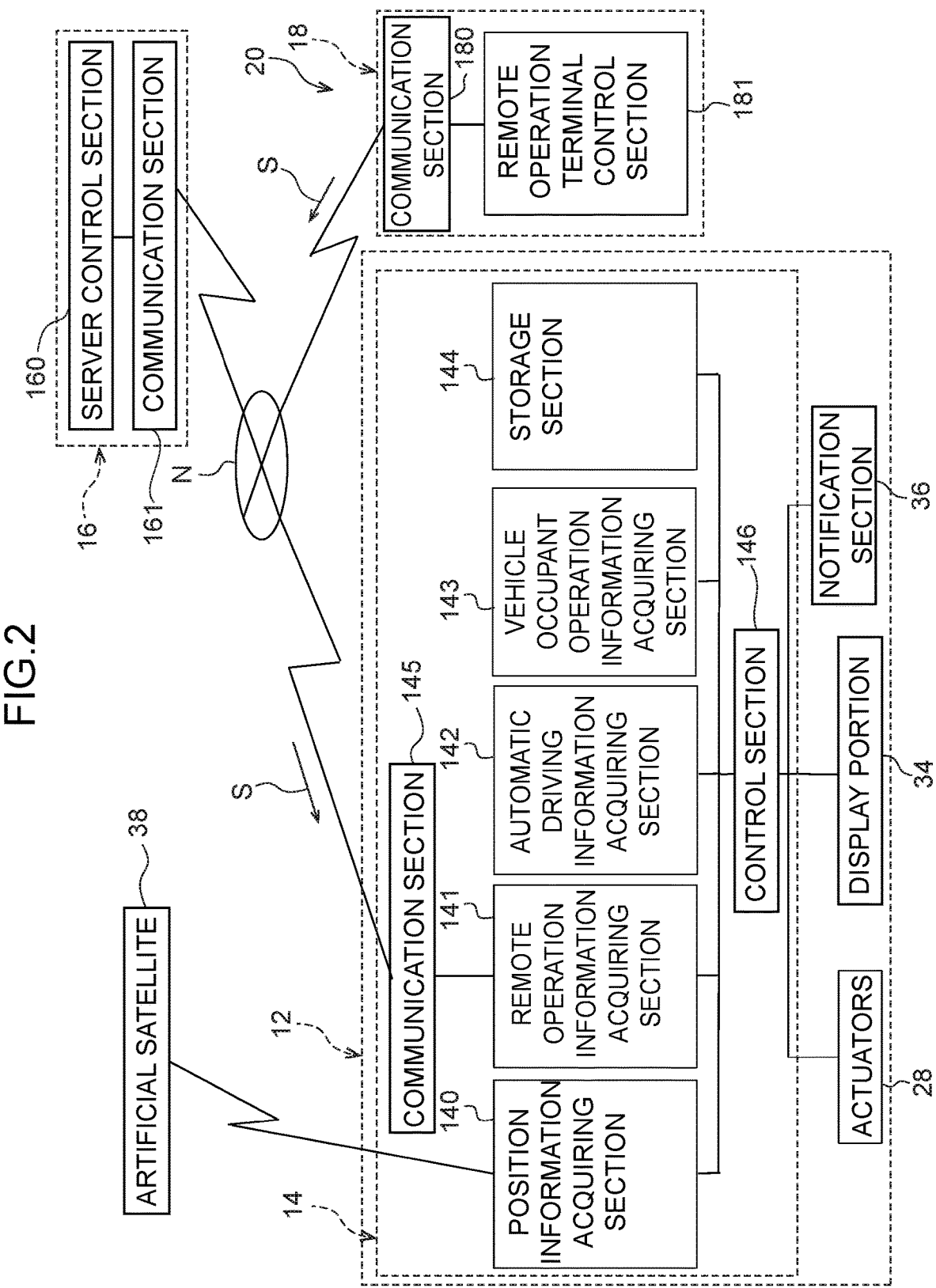
FIG. 2 is a functional block drawing showing the structure of the vehicle position sensing system relating to the first embodiment.

The functional structures of the vehicle control device 14 are described by using FIG. 2. Due to the CPU 14A reading-out an execution program that is stored in the ROM 14B and executing the program, the vehicle control device 14 functions as an aggregate of a "position information acquiring section 140", a remote operation information acquiring section 141, an automatic driving information acquiring section 142, a vehicle occupant operation information acquiring section 143, a "storage section 144", a communication section 145, and a "control section 146".

The position information acquiring section 140 acquires position information of the vehicle 12 that is measured by the GPS device 24, and can transmit, to the control section 146, a signal that is based on this position information.

On the basis of signals S transmitted from a communication section 180 that is described later of the remote operation device 20, the remote operation information acquiring section 141 acquires data relating to control of the actuators 28, and transmits signals based on these data to the control section 146. Further, the remote operation information acquiring section 141 also acquires data of captured images and the like that are acquired at the external sensors 26, and transmits signals based on these data to the communication section 145.

On the basis of signals inputted from the input devices 32, the vehicle occupant operation information acquiring section 143 acquires data relating to the amounts of operation by the operator 22, and transmits signals based on these data to the control section 146.

The above-described environment information is stored in the storage section 144. First regional information, which expresses "automatic driving regions 40" in which the vehicle 12 can be driven automatically and "remote driving regions 42" in which the vehicle 12 can be driven by remote operation, and second regional information, which expresses "manual driving regions 44" (see FIG. 4) where only manual driving of the vehicle 12 is permitted, are included in the environment information. Note that the various types of data that are stored in the storage section 144 are transmitted to the control section 146.

The communication section 145 receives the signals S transmitted from the remote operation device 20, and transmits them to the remote operation information acquiring section 141. Further, the communication section 145 transmits, to the server 16, the data acquired by the external sensors 26.

The automatic driving information acquiring section 142 acquires automatic driving information, i.e., data that is needed for automatic driving of the vehicle 12. Position information of the vehicle 12 that is measured by the GPS device 24, data relating to the peripheral environment of the vehicle 12 that is obtained by the external sensors 26, data relating to the traveling state of the vehicle 12 that is obtained by the internal sensors 30, environment information obtained from the server 16, and the like are included in the information that is acquired by the automatic driving information acquiring section 142. The above-described data that are acquired by the automatic driving information acquiring section 142 are transmitted to the control section 146.

On the basis of a signal from the touch panel, the control section 146 transmits the status signal to the remote operation device 20 via the communication section 145. Further, in a case in which the automatic driving mode of the vehicle 12 is selected at the touch panel, on the basis of the destination inputted at the touch panel and the information acquired by the automatic driving information acquiring section 142, a "route 46" (see FIG. 4) along which the vehicle 12 is to travel is set by the control section 146.

Further, the control section 146 controls the actuators 28, and automatic driving of the vehicle 12 can be carried out.

In a case in which the remote operation mode of the vehicle 12 is selected at the touch panel, the control section 146 controls the actuators 28 on the basis of the signals S from the remote operation device 20 that are received by the communication section 145, and can control the traveling of the vehicle 12.

Moreover, in a case in which the manual driving mode of the vehicle 12 is selected at the touch panel, the control section 146 controls the actuators 28 on the basis of signals from the vehicle occupant operation information acquiring section 143, and can control the traveling of the vehicle 12.

The structure of the server 16 is described next. The server 16 is structured to include a CPU, a ROM, a RAM, a storage and a communication I/F (not illustrated). The CPU, the ROM, the RAM, the storage and the communication I/F are connected via a bus (not illustrated) so as to be able to communicate with one another. Note that the CPU, the ROM, the RAM, the storage and the communication I/F have functions that are basically similar to those of the corresponding components that structure the above-described vehicle control device 14. Further, the server 16 can exhibit various functions due to an execution program that is stored in the ROM being read-out and executed by the CPU.

Concretely, the server 16 functions as an aggregate of a server control section 160 and a communication section 161. The server control section 160 has the function of acquiring various information from outside the server 16. Note that, in addition to the above-described environment information, news information and data that is based on the signals S transmitted from the remote operation device 20 are also included in the information acquired by the server control section 160.

On the other hand, the communication section 161 receives the signals S transmitted from the remote operation device 20. On the basis of the data acquired at the server control section 160, the communication section 161 transmits the signals S and signals based on various data to the vehicle 12, and transmits signals based on various data to the remote operation device 20.

The structure of the remote operation device 20 is described next. As shown in FIG. 1 as well, the remote operation device 20 has the remote control device 18, a monitor 20A and input devices 20B. Note that the input devices 20B of the remote operation device 20 have basically the same structures as the input devices 32.

The hardware structures of the remote control device 18 are structures that are basically similar to those of the vehicle control device 14. The remote control device 18 functions as an aggregate of the communication section 180 and a remote operation terminal control section 181. Further, the monitor 20A and the input devices 20B are connected to the remote control device 18 such that communication therebetween is possible.

On the basis of signals received from the remote operation terminal control section 181, the communication section 180 transmits, to the server 16, the signals S that are based on the operation amounts of the input devices 20B, and receives, from the server 16, signals that are based on various data. Note that the environment information and data, which is acquired by the external sensors 26 of the vehicle 12 and is the images captured by the cameras, is included in the data transmitted from the server 16.

The remote operation terminal control section 181 acquires the data that is detected at the input devices 20B, and transmits the data to the communication section 145 via the communication section 180 and the server 16. Further, on the basis of the data acquired from the communication section 180, the remote operation terminal control section 181 controls the monitor 20A, and can display the images captured by the cameras of the vehicle 12 on the monitor 20A.

Here, the present embodiment has the features in the point that the automatic driving regions 40, the remote driving regions 42 and the manual driving regions 44 can be displayed on the display 34, and in the conditions for operating the alarm 36.

Figure 4:
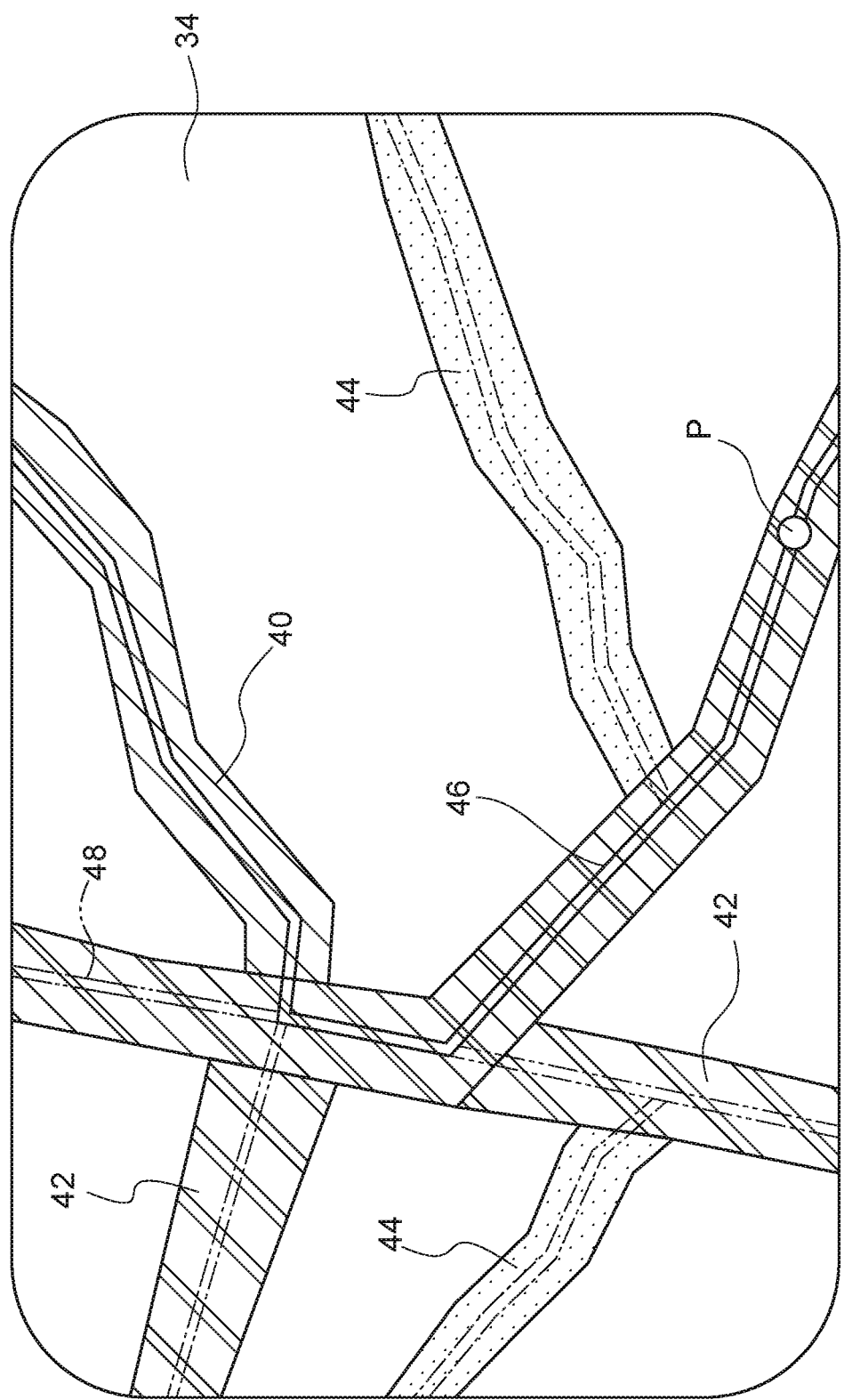
FIG. 4 is a conceptual drawing that schematically shows an example of a display screen of a display portion in the vehicle position sensing system relating to the first embodiment.

As shown in FIG. 4, due to the control section 146 controlling the display 34 on the basis of the position information of the vehicle 12 and the environment information and the like, the relative positional relationships among the vehicle 12, the automatic driving regions 40, the remote driving regions 42 and the manual driving regions 44 are displayed on the display 34. In the present embodiment, as an example, of a road 48, the portions at which only automatic driving and manual driving are permitted and the portions, which run along these portions and are within a predetermined distance thereof, are set as the automatic driving regions 40, and these are shown in FIG. 4 by hatching of a pattern in which a single diagonal line is repeated. Note that, in actuality, the automatic driving regions 40 are marked by a predetermined color on the display surface of the display 34.

Further, of the road 48, the portions at which only remote operation driving and manual driving are permitted and the portions, which run along these portions and are within a predetermined distance thereof, are set as the remote driving regions 42, and these are shown in FIG. 4 by hatching of a pattern in which two diagonal lines are repeated. Note that, in actuality, the remote driving regions 42 are marked by a predetermined color, which is other than the color of the automatic driving regions 40, on the display surface of the display 34.

Moreover, of the road 48, the portions at which automatic driving, remote operation driving and manual driving are permitted and the portions, which run along these portions and are within a predetermined distance thereof, are shown in FIG. 4 by hatching of a pattern in which three diagonal lines are repeated. Note that, in actuality, these regions are marked by a color, which is a mixture of the color of the automatic driving regions 40 and the color of the remote driving regions 42, on the display surface of the display 34.

In addition, of the road 48, the portions at which only manual driving is permitted and the portions, which run along these portions and are within a predetermined distance thereof, are set as the manual driving regions 44, and these are shown by the hatching of the dot pattern. Note that, in actuality, the manual driving regions 44 are marked by a predetermined color, which is other than the colors of the automatic driving regions 40 and the remote driving regions 42, on the display surface of the display 34.

Note that, in FIG. 4, the position of the vehicle 12 is shown by pointer P, and the route 46 along which the vehicle 12 travels is the portion shown by the solid lines on the road 48.

In the present embodiment, when, while the vehicle 12 is in the midst of being driven automatically on the route 46, the vehicle 12 is positioned at a position that is within a predetermined distance of a region where automatic driving is impossible, the alarm 36 issues a warning to the operator 22 on the basis of a control signal from the vehicle control device 14. On the other hand, when, while the vehicle 12 is in the midst of being driven by remote operation on the route 46, the vehicle 12 is positioned at a position that is within a predetermined distance of a region where remote operation driving is impossible, the alarm 36 issues a warning to the operator 22 on the basis of a control signal from the vehicle control device 14.

Note that an onboard camera (not illustrated) that monitors the state of the operator 22 is installed within the vehicle cabin 12A. Data of the images captured by this onboard camera and the like are processed at the control section 146. In a case in which the alarm 36 is operated in the midst of automatic driving of the vehicle 12, if the control section 146 judges, from the data from the onboard camera and the like, that a return to manual driving by the operator 22 is impossible, the control section 146 moves the vehicle 12 off to a safe place.

On the other hand, in a case in which the alarm 36 is operated in the midst of remote operation driving of the vehicle 12, if it is judged, from the data from the onboard camera and the like, that a return to manual driving by the operator 22 is impossible, the control section 146 transmits a warning from the communication section 145 to the remote operation device 20. In this case, the operator of the remote operation device 20 (the remote operation driver of the vehicle 12) moves the vehicle 12 off to a safe place.

Operation and Effects of Present Embodiment

Operation and effects of the present embodiment are described next.

An example of the flow of the control at the vehicle position sensing system 10 is described hereinafter mainly by using the flowcharts shown in FIG. 5 through FIG. 8.

Figure 5:
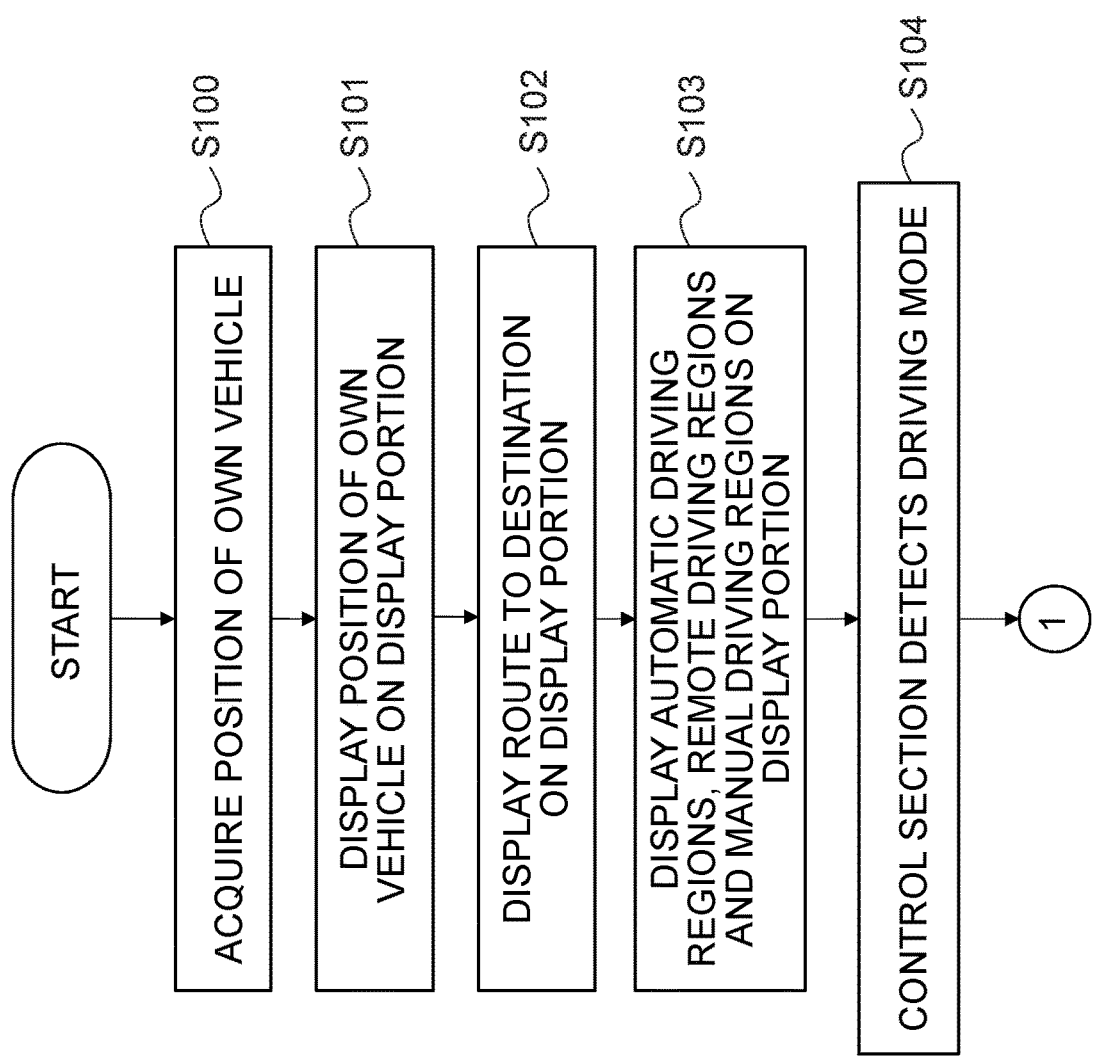
FIG. 5 is a flowchart showing the flow of processings by the vehicle position sensing system relating to the first embodiment.

As shown in FIG. 5, when this control flow is started, in step S100, the CPU 14A of the vehicle control device 14 acquires the position of the vehicle 12.

In step S101, on the basis of the results of detection in step S100, the CPU 14A displays the position of the vehicle 12 on the display 34.

In step S102, the CPU 14A displays the route 46 to the destination on the display 34.

In step S103, the CPU 14A displays the automatic driving regions 40, the remote driving regions 42 and the manual driving regions 44 on the display 34.

In step S104, the CPU 14A detects the driving mode of the vehicle 12 on the basis of the status signal.

Figure 6:
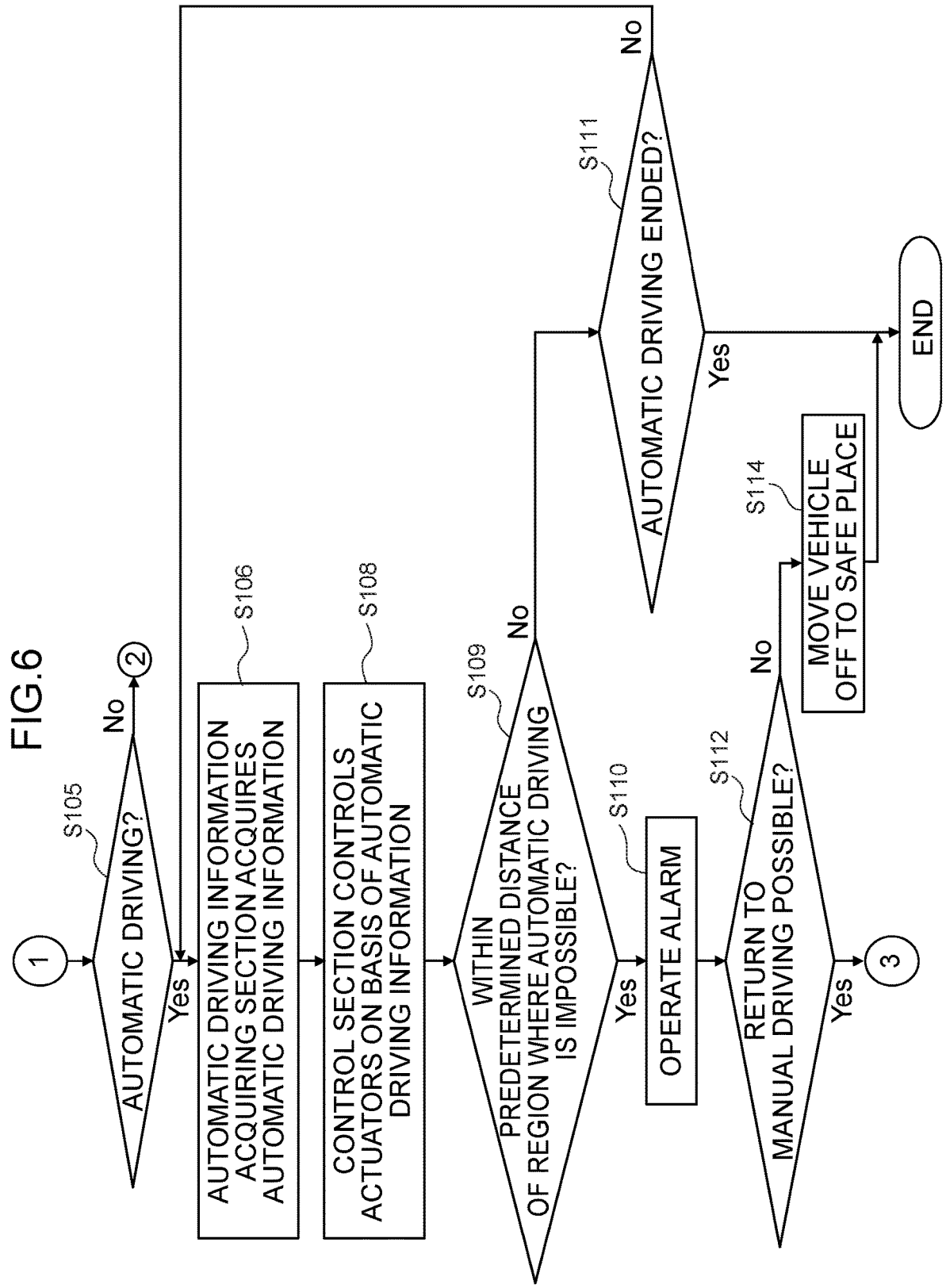
FIG. 6 is a flowchart showing the flow of processings by the vehicle position sensing system relating to the first embodiment.
Figure 7:
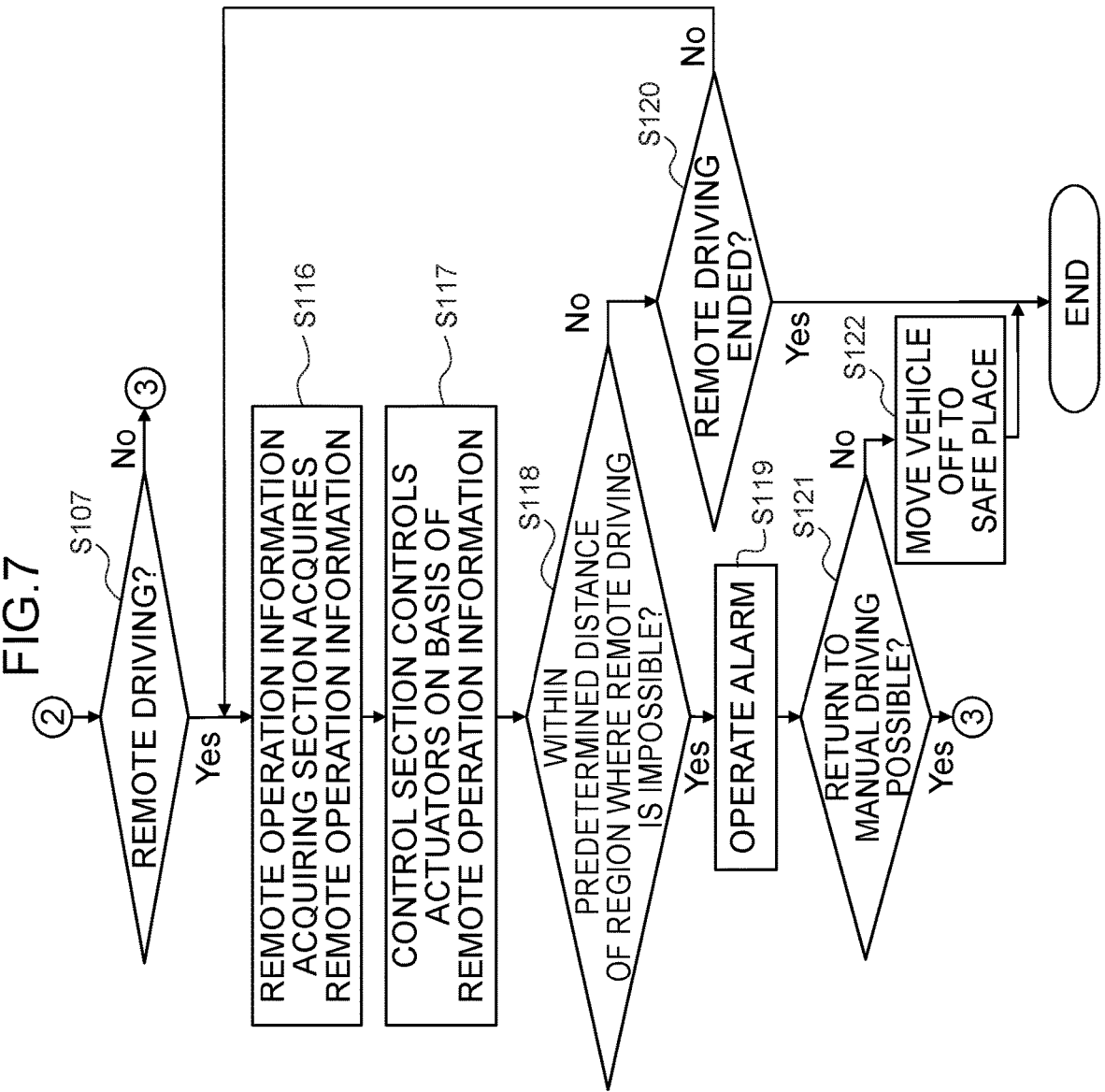
FIG. 7 is a flowchart showing the flow of processings by the vehicle position sensing system relating to the first embodiment.
Figure 8:
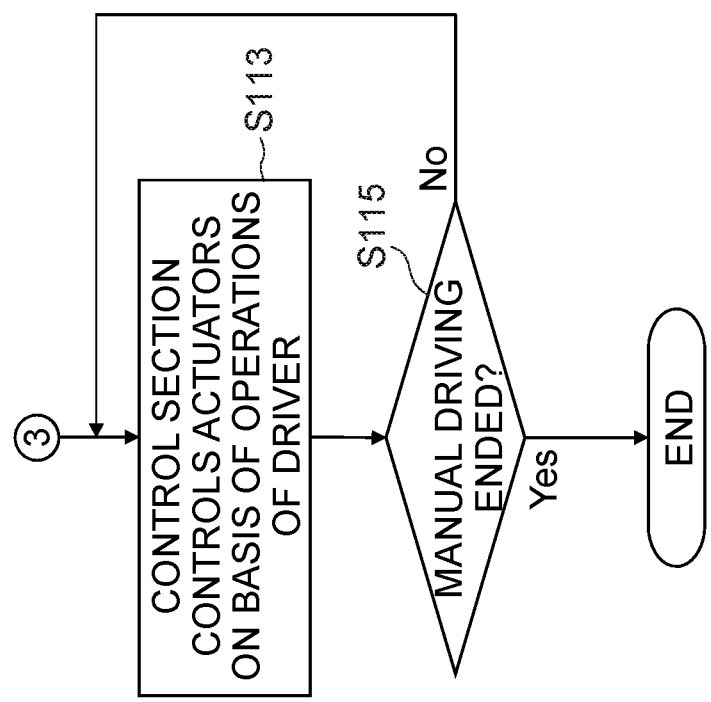
FIG. 8 is a flowchart showing the flow of processings by the vehicle position sensing system relating to the first embodiment.

In step S105 of FIG. 6, on the basis of the results of detection in step S104, the CPU 14A judges whether or not the driving mode of the vehicle 12 is the automatic driving mode. In a case in which the driving mode of the vehicle 12 is the automatic driving mode (step S105: YES), the CPU 14A moves on to step S106. In a case in which the driving mode of the vehicle 12 is not the automatic driving mode (step S105: NO), the CPU 14A moves on to step S107 of FIG. 7.

In step S106, the CPU 14A functions as the automatic driving information acquiring section 142, and acquires the automatic driving information.

In step S108, the CPU 14A functions as the control section 146, and, on the basis of the automatic driving information acquired in step S106, controls the actuators 28 and carries out automatic driving of the vehicle 12.

In step S109, on the basis of the position information of the vehicle 12 and the environment information, the CPU 14A judges whether or not the position of the vehicle 12 is within a predetermined distance from a region where automatic driving is impossible. If the position of the vehicle 12 is within a predetermined distance from a region where automatic driving is impossible (step S109: YES), the CPU 14A moves on to step S110. If the position of the vehicle 12 is not within a predetermined distance from a region where automatic driving is impossible (step S109: NO), the CPU 14A moves on to step S111.

In step S110, the CPU 14A operates the alarm 36.

In step S112, the CPU 14A functions as the control section 146, and judges whether or not the operator 22 can return to manual driving. If the operator 22 can return to manual driving (step S112: YES), the CPU 14A moves on to step S113 of FIG. 8. If the operator 22 cannot return to manual driving (step S112: NO), the CPU 14A moves on to step S114.

In step S113, the CPU 14A functions as the control section 146, and controls the actuators 28 on the basis of the operations of the operator 22.

In step S115, the CPU 14A detects the driving mode of the vehicle 12 on the basis of the status signal, and judges whether or not the manual driving mode has ended. If the manual driving mode is being continued (step S115: NO), the CPU 14A returns to step S113. If the manual driving mode has ended (step S115: YES), the CPU 14A ends the control flow.

On the other hand, in a case in which the CPU 14A moves on from step S112 to step S114, in step S114, the CPU 14A functions as the control section 146 and controls the actuators 28, and carries out automatic driving of the vehicle 12 and moves the vehicle 12 off to a safe place, and ends the control flow.

On the other hand, in a case in which the CPU 14A moves on from step S109 to step S111, in step S111, the CPU 14A detects the driving mode of the vehicle 12 on the basis of the status signal, and judges whether or not the automatic driving mode has ended. If the automatic driving mode is being continued (step S111: NO), the CPU 14A returns to step S106. If the automatic driving mode has ended (step S111: YES), the CPU 14A ends the control flow.

On the other hand, in a case in which the CPU 14A moves on from step S105 to step S107, in step S107, the CPU 14A judges whether or not the driving mode of the vehicle 12 is the remote operation mode. If the driving mode of the vehicle is the remote operation mode (step S107: YES), the CPU 14A moves on to step S116. If the driving mode of the vehicle 12 is not the remote operation mode (step S107: NO), the CPU 14A moves on to step S113 of FIG. 8.

In step S116, the CPU 14A functions as the remote operation information acquiring section 141, and acquires remote operation information from the communication section 145.

In step S117, the CPU 14A functions as the control section 146, and controls the actuators 28 on the basis of the remote operation information.

In step S118, on the basis of the position information of the vehicle 12 and the environment information, the CPU 14A judges whether or not the position of the vehicle 12 is within a predetermined distance from a region where remote operation driving is impossible. If the position of the vehicle 12 is within a predetermined distance from a region where remote operation driving is impossible (step S118: YES), the CPU 14A moves on to step S119. If the position of the vehicle 12 is not within a predetermined distance from a region where remote operation driving is impossible (step S118: NO), the CPU 14A moves on to step S120.

In step S119, the CPU 14A operates the alarm 36.

In step S121, the CPU 14A carries out the same processing as in step S112. Then, if the operator 22 can return to manual driving (step S121: YES), the CPU 14A moves on to step S113 of FIG. 8. If the operator 22 cannot return to manual driving (step S121: NO), the CPU 14A moves on to step S122.

In the case of moving on from step S121 to step S122, the CPU 14A functions as the control section 146, and transmits a warning from the communication section 145 toward the remote operation device 20. Then, the operator of the remote operation device 20 moves the vehicle 12 off to a safe place and ends the remote operation driving, and the control flow ends.

On the other hand, in the case of moving on from step S118 to step S120, in step S120, the CPU 14A detects the driving mode of the vehicle 12 on the basis of the status signal, and judges whether or not the remote operation mode has ended. If the remote operation mode is continuing (step S120: NO), the CPU 14A returns to step S116. If the remote operation mode has ended (step S120: YES), the CPU 14A ends the control flow.

As described above, in the present embodiment, the operator 22 of the vehicle 12 can perceive regions in which manual driving is required, regions in which automatic driving of the vehicle 12 is possible, and regions in which remote operation driving of the vehicle 12 is possible.

Further, in the present embodiment, on the route 46 to the destination of the vehicle 12, the operator 22 can perceive the manual driving regions 44, the automatic driving regions 40 and the remote driving regions 42.

In the present embodiment, the operator 22 can, without looking at the display 34, know that the vehicle 12 is approaching the manual driving region 44.

Second Embodiment

A "vehicle position sensing system 50" relating to a second embodiment of the present invention is described hereinafter by using FIG. 9. Note that structural portions that are the same as those of the above-described first embodiment are denoted by the same reference numerals, and description thereof is omitted.

In the present embodiment, an "organic EL display 54" that serves as the display portion is affixed to the "windshield glass 52" of the vehicle 12 along a surface thereof on the vehicle cabin 12A inner side. This organic EL display 54 is transparent, and can display various images by being driven by signals outputted from the vehicle control device 14.

Further, in the present embodiment, in a state in which the vehicle 12 is positioned on the route 46, due to the organic EL display 54 being controlled by the control section 146, a virtual wall portion 56 that runs along the automatic driving region 40, a virtual wall portion 58 that runs along the remote driving region 42, and a virtual wall portion 60 that runs along the manual driving region 44 can be displayed on the organic EL display 54 so as to overlap the scene that can be seen from the windshield glass 52.

In accordance with such a structure, the operator 22 can see the manual driving regions 44, the automatic driving regions 40 and the remote driving regions 42 without looking away from the vehicle front side.

SUPPLEMENTARY DESCRIPTION OF ABOVE-DESCRIBED EMBODIMENTS (1) In the above-described embodiments, the manual driving regions 44, the automatic driving regions 40 and the remote driving regions 42 can be displayed on the display portion. However, display may be carried out such that the manual driving regions 44, and either one of the automatic driving regions 40 and the remote driving regions 42, are displayed on the display portion. Namely, the automatic driving regions 40 or the remote driving regions 42 may be included in the first region information.

(2) The warning that the alarm 36 issues may be a voice to the operator 22, or light emitted toward the operator 22, or vibrations to the operator 22.

What is claimed is:

1. A vehicle position sensing system comprising:
a memory configured to store first region information, which expresses at least one type of region among automatic driving regions where automatic driving of a vehicle is possible and remote driving regions where remote operation driving of the vehicle is possible, the first region information including the automatic driving regions and the remote driving regions, and second region information that expresses manual driving regions where only manual driving of the vehicle is permitted;
a display that is viewable by an occupant of the vehicle, and is configured to display the automatic driving regions and the remote driving regions; and
a processor configured to:
acquire position information of the vehicle; and
based on the position information, the first region information and the second region information, cause the display to display relative positional relationships among the vehicle, the manual driving regions and the at least one type of region.

2. The vehicle position sensing system of claim 1, wherein the processor is configured to cause the display to display the relative positional relationships among a position of the vehicle, the manual driving regions and the at least one type of region in a planar form.

3. The vehicle position sensing system of claim 2, wherein the processor is configured to cause the display to display a route of the vehicle to a destination.

4. The vehicle position sensing system of claim 3, wherein the vehicle has an alarm that, in a state in which the vehicle is positioned in the at least one type of region on the route, issues a warning to an occupant of the vehicle when the vehicle is positioned at a position that is within a predetermined distance from the manual driving regions.

5. The vehicle position sensing system of claim 3, wherein, in a state in which the vehicle is positioned on the route, the processor is configured to cause to be displayed, on a windshield glass of the vehicle, three-dimensional objects that enable an occupant of the vehicle to identify the manual driving regions and the at least one type of region, such that the three-dimensional objects run along the route and overlap a scene that can be seen from the windshield glass.

6. A vehicle position sensing system comprising:
a memory configured to store first region information, which expresses at least one type of region among automatic driving regions where automatic driving of a vehicle is possible and remote driving regions where remote operation driving of the vehicle is possible, and second region information that expresses manual driving regions where only manual driving of the vehicle is permitted;
a display that is viewable by an occupant of the vehicle; and
a processor configured to:
acquire position information of the vehicle; and
based on the position information, the first region information and the second region information, cause the display to display:
relative positional relationships among a position of the vehicle, the manual driving regions and the at least one type of region in a planar form; and
a route of the vehicle to a destination,
wherein the vehicle has an alarm that, in a state in which the vehicle is positioned in the at least one type of region on the route, issues a warning to an occupant of the vehicle when the vehicle is positioned at a position that is within a predetermined distance from the manual driving regions.

7. A vehicle position sensing system comprising:
a memory configured to store first region information, which expresses at least one type of region among automatic driving regions where automatic driving of a vehicle is possible and remote driving regions where remote operation driving of the vehicle is possible, and second region information that expresses manual driving regions where only manual driving of the vehicle is permitted;
a display that is viewable by an occupant of the vehicle; and
a processor configured to:
acquire position information of the vehicle; and
based on the position information, the first region information and the second region information, cause the display to display:
relative positional relationships among a position of the vehicle, the manual driving regions and the at least one type of region in a planar form; and
a route of the vehicle to a destination; and
in a state in which the vehicle is positioned on the route, cause to be displayed, on a windshield glass of the vehicle, three-dimensional objects that enable an occupant of the vehicle to identify the manual driving regions and the at least one type of region, such that the three-dimensional objects run along the route and overlap a scene that can be seen from the windshield glass.

* * * * *